United States Patent
Miyazaki et al.

(10) Patent No.: US 7,240,099 B2
(45) Date of Patent: Jul. 3, 2007

(54) SYSTEM AND METHOD FOR EFFICIENTLY PERFORMING DATA TRANSFER OPERATIONS

(75) Inventors: Takako Miyazaki, New York, NY (US); Eric D. Edwards, San Francisco, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 896 days.

(21) Appl. No.: 09/784,730

(22) Filed: Feb. 15, 2001

(65) Prior Publication Data

US 2001/0029520 A1 Oct. 11, 2001

Related U.S. Application Data

(60) Provisional application No. 60/187,319, filed on Mar. 6, 2000.

(51) Int. Cl.
*G06F 15/16* (2006.01)
(52) U.S. Cl. .................. 709/213; 709/203; 709/232; 709/233
(58) Field of Classification Search .............. 709/232, 709/224, 236, 233, 203, 213
See application file for complete search history.

(56) References Cited

U.S. PATENT DOCUMENTS

| | | | |
|---|---|---|---|
| 5,164,831 A | 11/1992 | Kuchta et al. ............. 358/209 |
| 5,426,513 A | 6/1995 | Scorse et al. ............... 358/433 |
| 5,774,583 A * | 6/1998 | Sasaki et al. ............... 382/190 |
| 5,959,596 A | 9/1999 | McCarten et al. ............ 345/2 |
| 6,038,257 A | 3/2000 | Brusewitz et al. .......... 375/240 |
| 6,065,059 A * | 5/2000 | Shieh et al. ................ 709/233 |
| 6,076,111 A * | 6/2000 | Chiu et al. .................. 709/232 |
| 6,078,919 A * | 6/2000 | Ginzburg et al. ............ 707/10 |
| 6,166,729 A * | 12/2000 | Acosta et al. ............... 345/719 |
| 6,512,776 B1 * | 1/2003 | Jones et al. ................. 370/465 |
| 2001/0010059 A1 * | 7/2001 | Burman et al. ............. 709/224 |
| 2001/0037402 A1 * | 11/2001 | Schneider ................... 709/236 |
| 2003/0037158 A1 * | 2/2003 | Yano et al ................. 709/232 |

FOREIGN PATENT DOCUMENTS

| | | |
|---|---|---|
| EP | 0895374 | 3/1998 |
| EP | 0992922 | 9/1999 |
| JP | 110257122 | * 9/1998 |

* cited by examiner

*Primary Examiner*—Rupal Dharia
*Assistant Examiner*—Djenane Bayard
(74) *Attorney, Agent, or Firm*—Gregory J. Koerner; Redwood Patent Law (57) ABSTRACT

A system and method for efficiently performing data transfer operations includes a source device for providing transfer data through a communication path or network to a destination device. The source device has a transfer manager that determines various transfer parameters including a transfer data size, a transfer speed, and a transfer duration. The transfer parameters are then presented on a user interface for interactive use by a system user to manipulate the transfer data with various transfer options to thereby perform the data transfer operation in an optimal manner under current transfer conditions.

43 Claims, 8 Drawing Sheets

SYSTEM AND METHOD FOR EFFICIENTLY PERFORMING DATA TRANSFER OPERATIONS

CROSS-REFERENCE TO RELATED APPLICATIONS

This application relates to, and claims priority in, U.S. Provisional Patent Application Ser. No. 60/187,319, entitled "Camera Features Transfer Time Indicator," filed on Mar. 6, 2000. The foregoing related application is commonly assigned, and is hereby incorporated by reference.

BACKGROUND SECTION

1. Field of the Invention

This invention relates generally to techniques for transferring electronic information, and relates more particularly to a system and method for efficiently performing data transfer operations.

2. Description of the Background Art

Implementing efficient methods for transferring information is a significant consideration for designers and manufacturers of contemporary electronic devices. However, efficiently transferring information with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced data transfer operations may provide additional benefits to a system user, but may also place increased demands on the control and management of various device components. For example, an enhanced electronic device that effectively transfers digital image data may benefit from an efficient implementation because of the large amount and complexity of the digital data involved.

Due to growing demands on system resources and substantially increasing data magnitudes, it is apparent that developing new techniques for transferring information is a matter of concern for related electronic technologies. Therefore, for all the foregoing reasons, developing effective systems for transferring information remains a significant consideration for designers, manufacturers, and users of contemporary electronic devices.

SUMMARY

In accordance with the present invention, a system and method are disclosed for efficiently performing data transfer operations. In one embodiment, initially, an electronic device waits for a data transfer request from a system user or other source (such as application software) to perform a data transfer operation using selected transfer data. In certain embodiments, the electronic device may be implemented as a digital camera device, and the transfer data may include captured digital image data.

If the electronic device receives a data transfer request, then a transfer manager from the electronic device may preferably determine a transfer data size value corresponding to the specific transfer data for the requested data transfer operation. In addition, a bandwidth monitor from the transfer manager may preferably determine the current bandwidth (or transfer speed value) for the communication link between the electronic device and a particular destination device for the proposed data transfer operation.

A calculation module from the transfer manager may then preferably calculate a transfer time value for the proposed data transfer operation. The transfer manager may determine the foregoing transfer time value using any appropriate technique. For example, the transfer manager may utilize the previously-determined transfer data size value and transfer speed value to determine a transfer time value.

A user interface module and a display manager from the electronic device may then preferably access various transfer parameters from a local memory, and responsively display the transfer parameters for viewing by a system user. The transfer parameters preferably may include the transfer data size value, the transfer speed value, and the transfer time value discussed above.

Next, the system user may determine whether the displayed transfer parameters (in particular, the transfer time value) are acceptable under current circumstances. If the displayed transfer parameters are acceptable to the system user, then the electronic device may preferably perform the proposed data transfer operation after receiving an authorization from the system user.

However, if the displayed transfer parameters are not acceptable to the system user, then the electronic device may preferably display various transfer options for viewing by the system user. The system user may then interactively utilize the displayed transfer options to manipulate the transfer data for an optimal performance of the data transfer operation. The present invention may then preferably return to recalculate and display updated transfer parameters until the system user accepts the current updated transfer parameters and authorizes the proposed data transfer operation. The present invention thus provides an improved system and method for efficiently performing data transfer operations.

BRIEF DESCRIPTION OF THE DRAWINGS

FIG. 1 is a block diagram for one embodiment of an electronic device, in accordance with the present invention;

FIG. 2 is a block diagram for one embodiment of the memory of FIG. 1, in accordance with the present invention;

FIG. 3 is a block diagram for one embodiment of the application software of FIG. 2, in accordance with the present invention;

FIG. 4 is a block diagram for one embodiment of the transfer manager of FIG. 2, in accordance with the present invention;

FIG. 5 is a block diagram for one embodiment of the I/O interface(s) of FIG. 1, in accordance with the present invention;

FIG. 6 is a block diagram for one embodiment of the display of FIG. 1, in accordance with the present invention;

FIG. 7 is a block diagram of an electronic data transfer system, in accordance with one embodiment of the present invention; and FIG. 8 is a flowchart of method steps for efficiently performing a data transfer operation, in accordance with one embodiment of the present invention.

DETAILED DESCRIPTION

The present invention relates to an improvement in information transfer techniques. The following description is presented to enable one of ordinary skill in the art to make and use the invention and is provided in the context of a patent application and its requirements. Various modifications to the disclosed embodiments will be readily apparent to those skilled in the art and the generic principles herein may be applied to other embodiments. Thus, the present invention is not intended to be limited to the embodiments shown, but is to be accorded the widest scope consistent with the principles and features described herein.

The present invention comprises a system and method for efficiently performing data transfer operations, and preferably includes a source electronic device for providing transfer data through a communication path or network to a destination electronic device or entity. The source electronic device preferably has a transfer manager that determines various transfer parameters that may include a transfer data size, a transfer speed, and a transfer duration. The transfer parameters may then be presented on a user interface for interactive use by a system user to manipulate the transfer data using various transfer options, to thereby perform the data transfer operation in an optimal manner under the current data transfer conditions.

Figure 1:
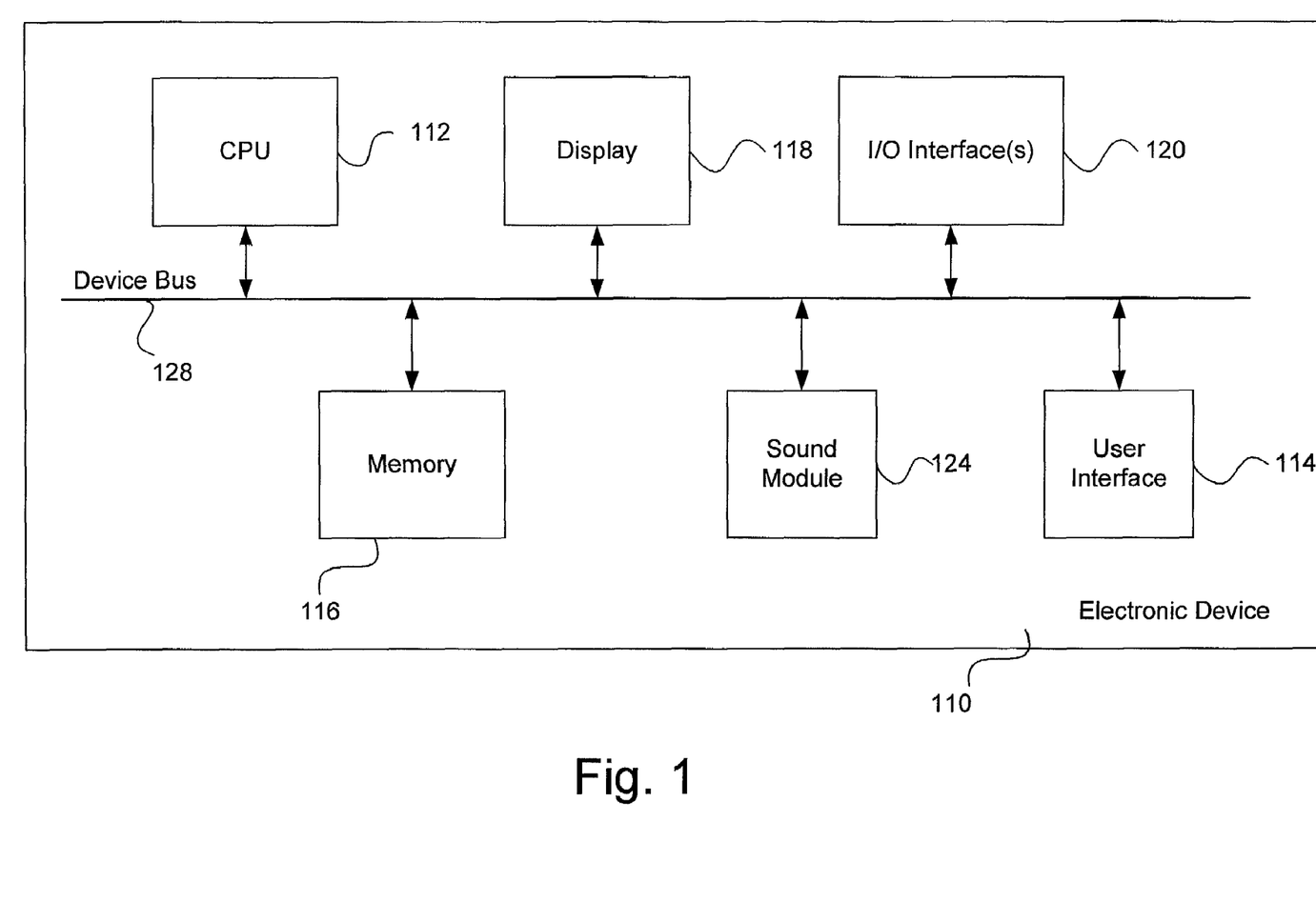

Referring now to FIG. 1, a block diagram for one embodiment of an electronic device 110 is shown, in accordance with the present invention. In the FIG. 1 embodiment, electronic device 110 preferably includes, but is not limited to, a central processing unit (CPU) 112, a user interface 114, memory 116, a display 118, input/output interface(s) (I/O interface(s)) 120, and a sound module 124. The foregoing components of electronic device 110 may preferably be coupled to, and communicate through, a device bus 128.

In alternate embodiments, electronic device 110 may readily be implemented using various components and configurations in addition to, or instead of, those discussed in conjunction with the FIG. 1 embodiment. In addition, electronic device 110 may readily be implemented to include any appropriate type of electronic device or entity. For example, electronic device 110 may be effectively implemented as an electronic still camera, an electronic video camera, a personal digital assistant (PDA) device, an electronic scanner device, a cellular telephone, or a portable electronic data capture device.

In the FIG. 1 embodiment, CPU 112 may be implemented to include any appropriate and compatible microprocessor device that preferably executes software instructions to thereby control and manage the operation of electronic device 110. The FIG. 1 display 118 preferably may include any effective type of display technology including a cathode-ray-tube monitor or a liquid-crystal display device. In certain embodiments, display 118 may be attached to an exterior surface of electronic device 110 with a hinge mechanism to permit display 118 to be folded against electronic device 110 when not in use, or during transport. Display 118 is further discussed below in conjunction with FIG. 6.

In the FIG. 1 embodiment, I/O interface(s) 120 preferably may include one or more input and/or output interfaces to receive and/or transmit any required types of relevant information by electronic device 110. I/O interface(s) 120 are further discussed below in conjunction with FIG. 5. In the FIG. 1 embodiment, memory 116 may be implemented to include any combination of desired storage devices, including, but not limited to, read-only memory (ROM), random-access memory (RAM), and various types of non-volatile memory, such as floppy disks or hard disks. The contents and functionality of memory 116 are further discussed below in conjunction with FIGS. 2 through 4.

Sound module 124 preferably may include appropriate interfaces to support audio functionality for electronic device 110. For example, in certain embodiments, sound module 124 may include, but is not limited to, an audio processing module, a power amplifier, one or more speaker devices, and a microphone device.

In the FIG. 1 embodiment, user interface 114 preferably may include any effective means to allow a system user to communicate with electronic device 110. For example, user interface 114 may support a keyboard device, a wireless remote control device, a speech-recognition module with corresponding microphone, a graphical user interface with touch-screen capability, or a selection button array mounted externally on electronic device 110. The functionality and operation of electronic device 110 is further discussed below in conjunction with FIGS. 2 through 8.

Figure 2:
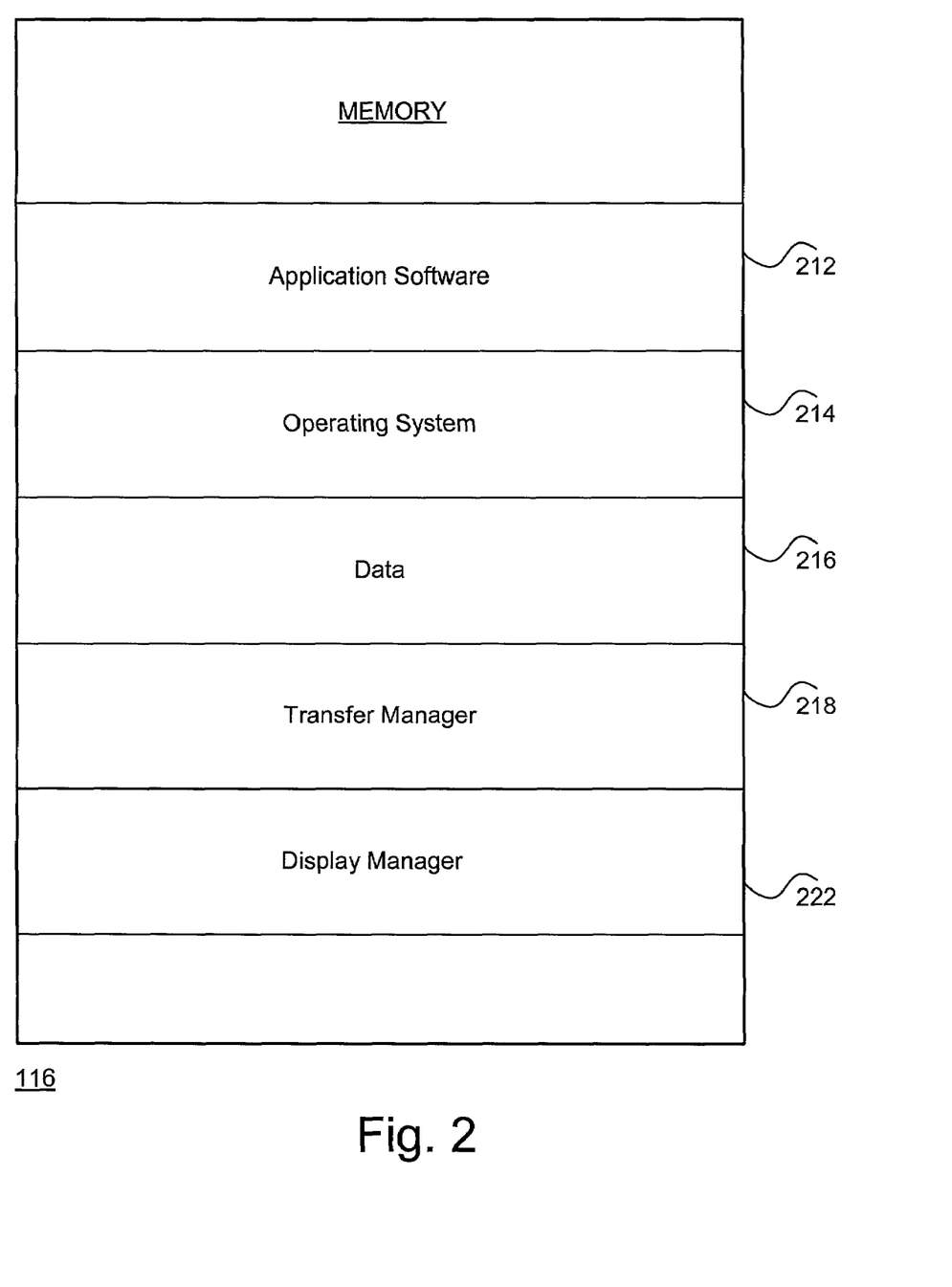

Referring now to FIG. 2, a block diagram for one embodiment of the FIG. 1 memory 116 is shown, in accordance with the present invention. In the FIG. 1 embodiment, memory 116 preferably includes, but is not limited to, application software 212, an operating system 214, data 216, a transfer manager 218, and a display manager 222. In alternate embodiments, memory 116 may readily include various other components in addition to, or instead of, those components discussed in conjunction with the FIG. 2 embodiment.

In the FIG. 2 embodiment, application software 212 may include program instructions that are preferably executed by CPU 112 (FIG. 1) to perform various functions and operations for electronic device 110. The particular nature and functionality of application software 212 preferably varies depending upon factors such as the specific type and particular use of the corresponding electronic device 110. The configuration and functionality of application software 212 is further discussed below in conjunction with FIG. 3.

In the FIG. 2 embodiment, operating system 214 preferably controls and coordinates low-level functionality of electronic device 110. Data 216 preferably includes various types of data that may be stored in memory 116. Data 216 preferably may include various types of captured image data, sound data, or other types of information. In accordance with the present invention, transfer manager 218 preferably may include program instructions for efficiently performing a data transfer operation. The operation and utilization of transfer manager 218 is further discussed below in conjunction with FIGS. 7 and 8.

In the FIG. 2 embodiment, display manager 222 preferably coordinates and controls the presentation of appropriate visual information on display 118 in response to instructions from application software 212. In certain embodiments, display manager 222 and associated hardware components may support a high-resolution display output for presentation of data 216 and user interface 114.

Figure 3:
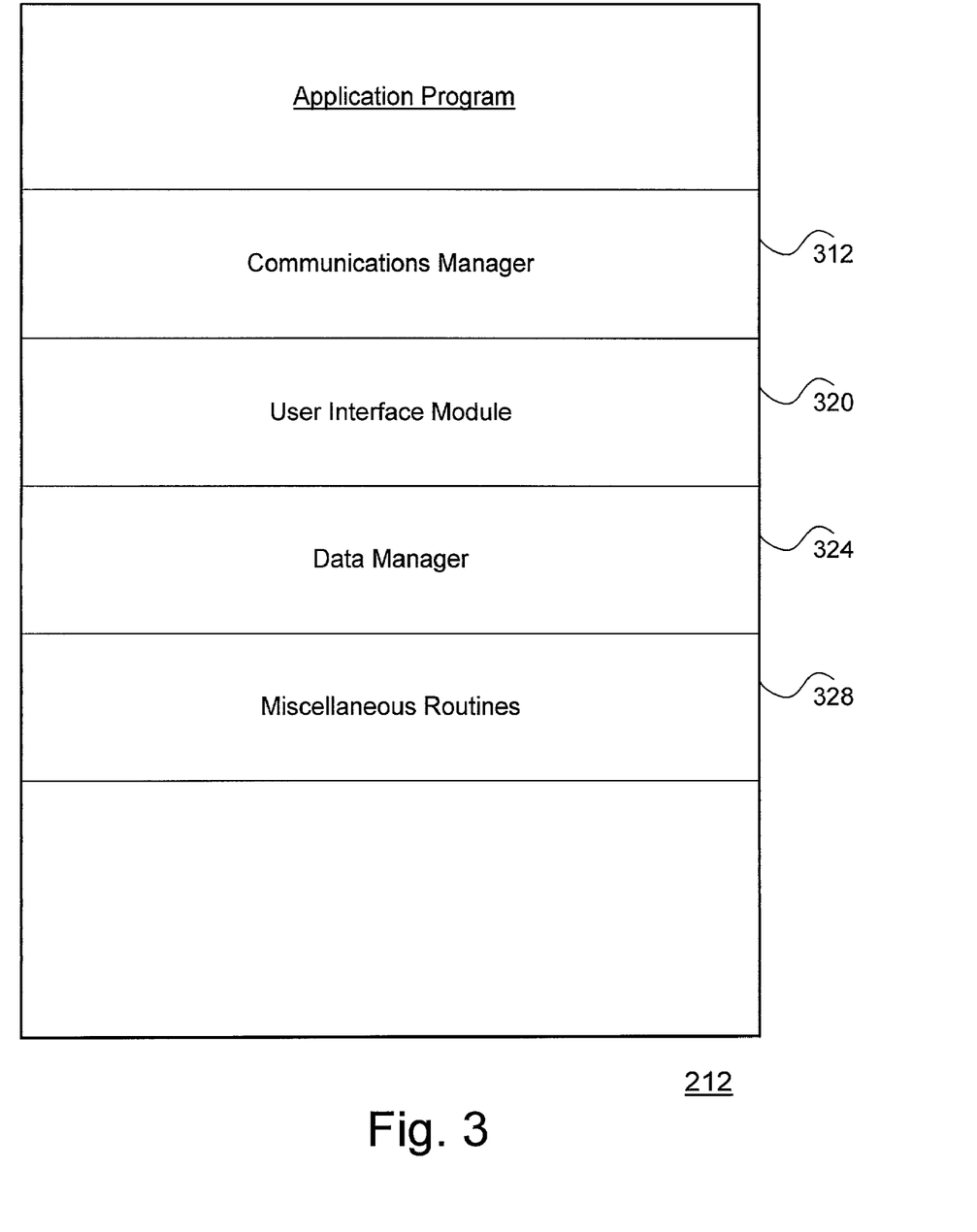

Referring now to FIG. 3, a block diagram for one embodiment of the FIG. 2 application software 212 is shown, in accordance with the present invention. In the FIG. 3 embodiment, application software 212 preferably may include, but is not limited to, a communications manager 312, a user interface module 320, a data manager 324, and miscellaneous routines 328. In alternate embodiments, application software 212 may readily include various other components in addition to, or instead of, those components discussed in conjunction with the FIG. 3 embodiment.

In the FIG. 3 embodiment, communications manager 312 preferably may coordinate the downloading and storing of various types of information from any appropriate source. In addition, communications manage 312 preferably may control the transfer of data 216 to various appropriate destinations. For example, communications manager 312 may provide data 216 to a destination device or to a networked destination entity such as a server on the Internet. User interface module 320 may preferably control various procedures for interactively providing information on user interface 114, in accordance with the present invention.

In the FIG. 3 embodiment, data manager 324 preferably may manage data 216 that is stored in electronic device 110. For example, data manager 324 may create and restructure data 216 into various directories and folders to effectively organize various portions of data 216. Miscellaneous routines 328 may include any desired software instructions to facilitate functions performed by electronic device 110. For example, miscellaneous routines 328 may include a data transformation routine that translates 216 into an uploadable format that is compatible with a selected destination entity.

Figure 4:
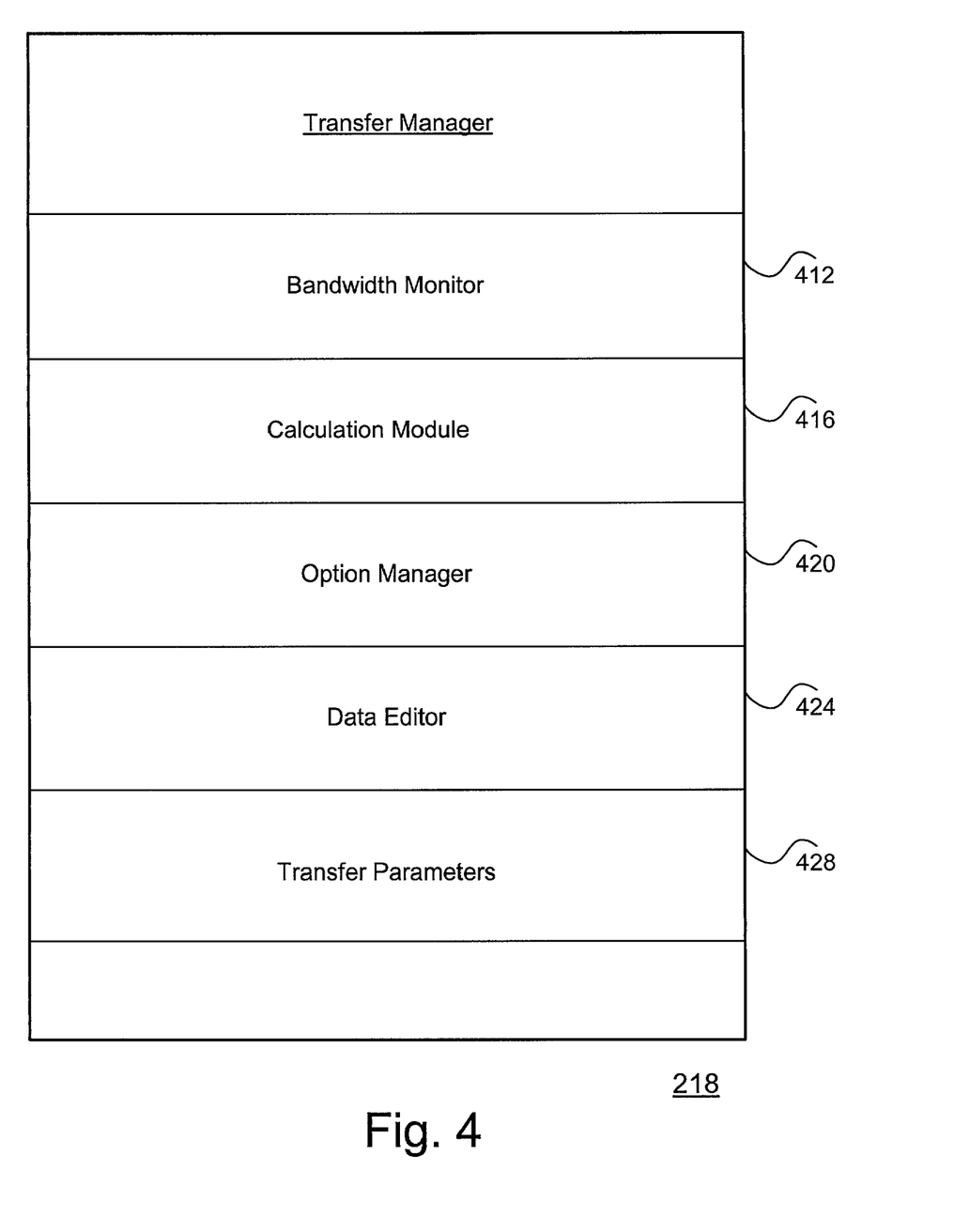

Referring now to FIG. 4, a block diagram for one embodiment of the FIG. 2 transfer manager 218 is shown, in accordance with the present invention. In the FIG. 4 embodiment, transfer manager 218 preferably may include a bandwidth monitor 412, a calculation module 416, an option manager 420, a data editor 424, and one or more transfer parameters 428. In alternate embodiments of the present invention, transfer manager 218 may readily be implemented to include various other configurations, and may also include various items and components that are different from those discussed in conjunction with the FIG. 4 embodiment.

In the FIG. 4 embodiment, transfer manager 218 may preferably utilize bandwidth monitor 412 to accurately determine a bandwidth or transfer speed for a particular data transfer operation to transmit data 216 to a destination device or entity. In the FIG. 4 embodiment, the foregoing bandwidth or transfer speed may preferably be expressed in bits per second. However, in alternate embodiments, bandwidth may be expressed in any suitable manner.

In the FIG. 4 embodiment, calculation module 416 may preferably access the foregoing transfer speed from bandwidth monitor 412. Calculation module 416 may also access data 216 to determine a corresponding data size value. Calculation module 416 may then calculate a transfer time for a requested data transfer operation. In the FIG. 4 embodiment, calculation module 416 may determine the foregoing transfer time according to the following formula:

Transfer Time=Data Size/Transfer Speed where Transfer Time is the amount of time required to complete a requested data transfer operation in seconds, Data Size is the size of data 216 to be transferred in bits, and Transfer Speed is the bandwidth of a particular transfer path for the data transfer operation in bits per second.

Option manager 420 may be utilized by electronic device 110 to present one or more transfer options by which a system user may interactively manipulate data 216 to efficiently perform a data transfer operation. Similarly, once a particular transfer option is chosen with option manager 420, then data editor 424 may manipulate data 216 in various ways to facilitate a more efficient data transfer operation.

In the FIG. 4 embodiment, transfer parameters 428 may include any desired values for use by electronic device 110 to efficiently perform a data transfer operation. For example, in certain embodiments, transfer parameters 416 may include at least one of a transfer data size value, a transfer speed value, and a transfer time value. The operation and utilization of transfer manager 218 is further discussed below in conjunction with FIGS. 6 through 8.

Figure 5:
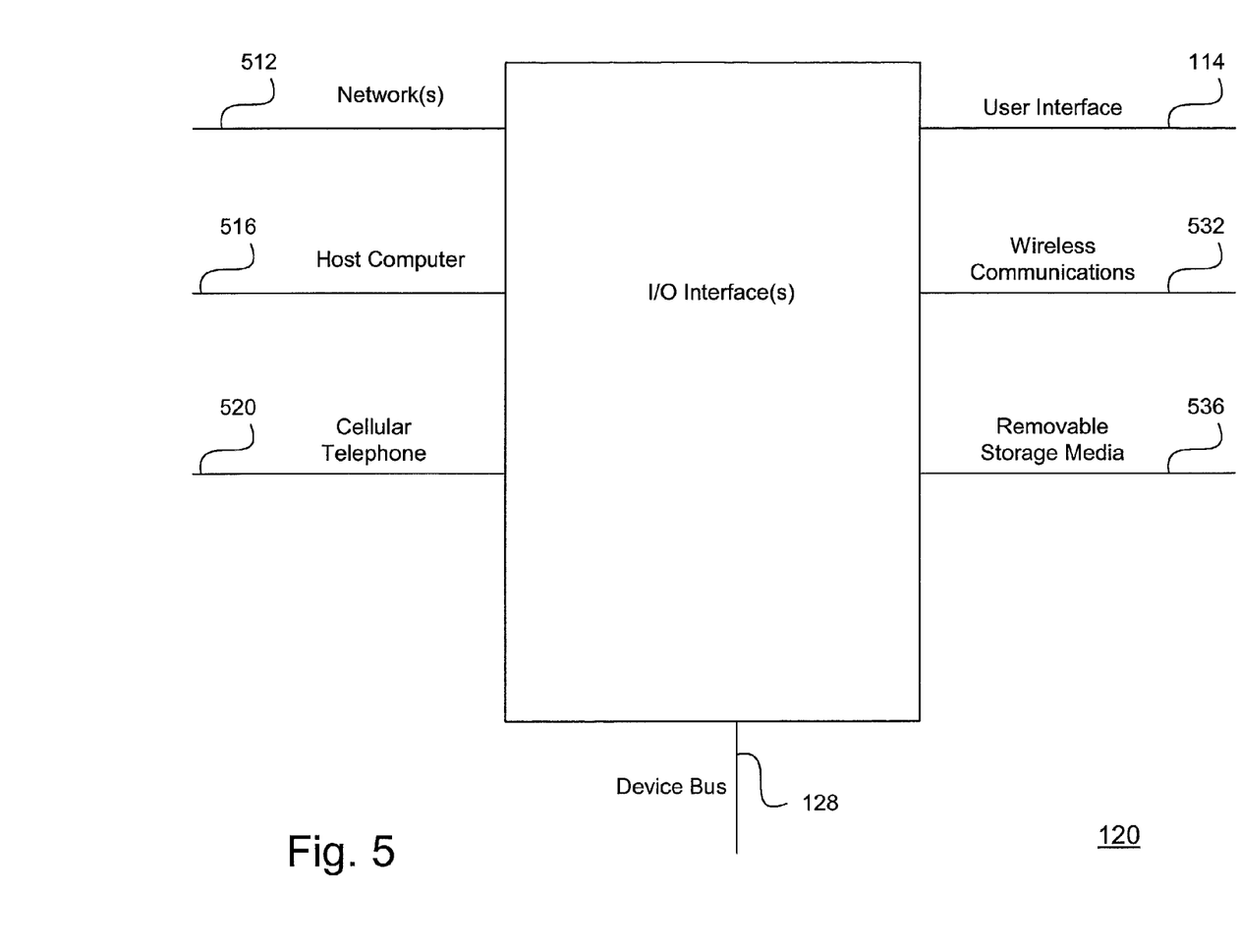

Referring now to FIG. 5, a block diagram for one embodiment of the FIG. 1 I/O interface(s) 120 is shown, in accordance with the present invention. In the FIG. 5 embodiment, I/O interface(s) 120 preferably may communicate with various input or output entities that may include, but are not limited to, network(s) 512, a host computer 516, cellular telephones 520, a user interface 114, wireless communications 532, and removable storage media 536. I/O interface(s) 120 may preferably communicate with electronic device 110 via device bus 128. In alternate embodiments, I/O interface(s) 120 may readily include various other elements and functionalities in addition to, or instead of, those discussed in conjunction with the FIG. 5 embodiment. In addition, I/O interface(s) 120 may be implemented and configured using any effective technology or method.

In the FIG. 5 embodiment, electronic device 110 may utilize I/O interface(s) 120 to bi-directionally communicate with one or more network(s) 512. For example, electronic device 110 may advantageously communicate with the Internet or other distributed computer networks to upload or download various types of data 216.

Electronic device 110 may also utilize I/O interface(s) 120 to bi-directionally communicate with a host computer 516. For example, electronic device 110 may communicate with a personal computer device over a Universal Serial Bus (USB) to effectively upload or download various types of data 216. The foregoing personal computer device may then be utilized to process, manipulate, and otherwise utilize the data 216 from electronic device 110. In the FIG. 5 embodiment, electronic device 110 may utilize I/O interface(s) 120 to bi-directionally communicate with one or more cellular telephones 520 to preferably transmit any desired data 216 from electronic device 110.

In the FIG. 5 embodiment, user interface 114 preferably may include any effective means to allow a system user to communicate with electronic device 110. For example, user interface 114 may support a keyboard device, a wireless remote control device, a speech-recognition module with corresponding microphone, a graphical user interface with touch-screen capability on display 118, or a selection button array mounted externally on electronic device 110.

In the FIG. 5 embodiment, electronic device 110 may also utilize I/O interface(s) 120 to bi-directionally communicate with various types of wireless communications 532. Wireless communications 532 preferably may include any effective means to remotely communicate with an external entity such as an Internet server or a cellular telephone network, to thereby provide data 216 from electronic device 110. Wireless communications 532 may be implemented using any appropriate wireless technology, including radio-frequency transmission, infra-red transmission, or micro-wave transmission.

In the FIG. 5 embodiment, removable storage media 536 may preferably be utilized to receive or provide any desired information for facilitating the operation of electronic device 110. In certain embodiments, removable storage media 536 may include memory devices to support any desired type or combination of removable storage media. For example, removable storage media 536 may include memory sticks, flash memory devices, compact disks, mini-disks, or floppy disks.

In addition to the various foregoing enumerated types of I/O interface(s) 120, electronic device 110 preferably may also include any required types of interfaces or connectors (not shown) for directly coupling electronic device 110 and other hardware devices to support bi-directional electronic communications.

Figure 6:
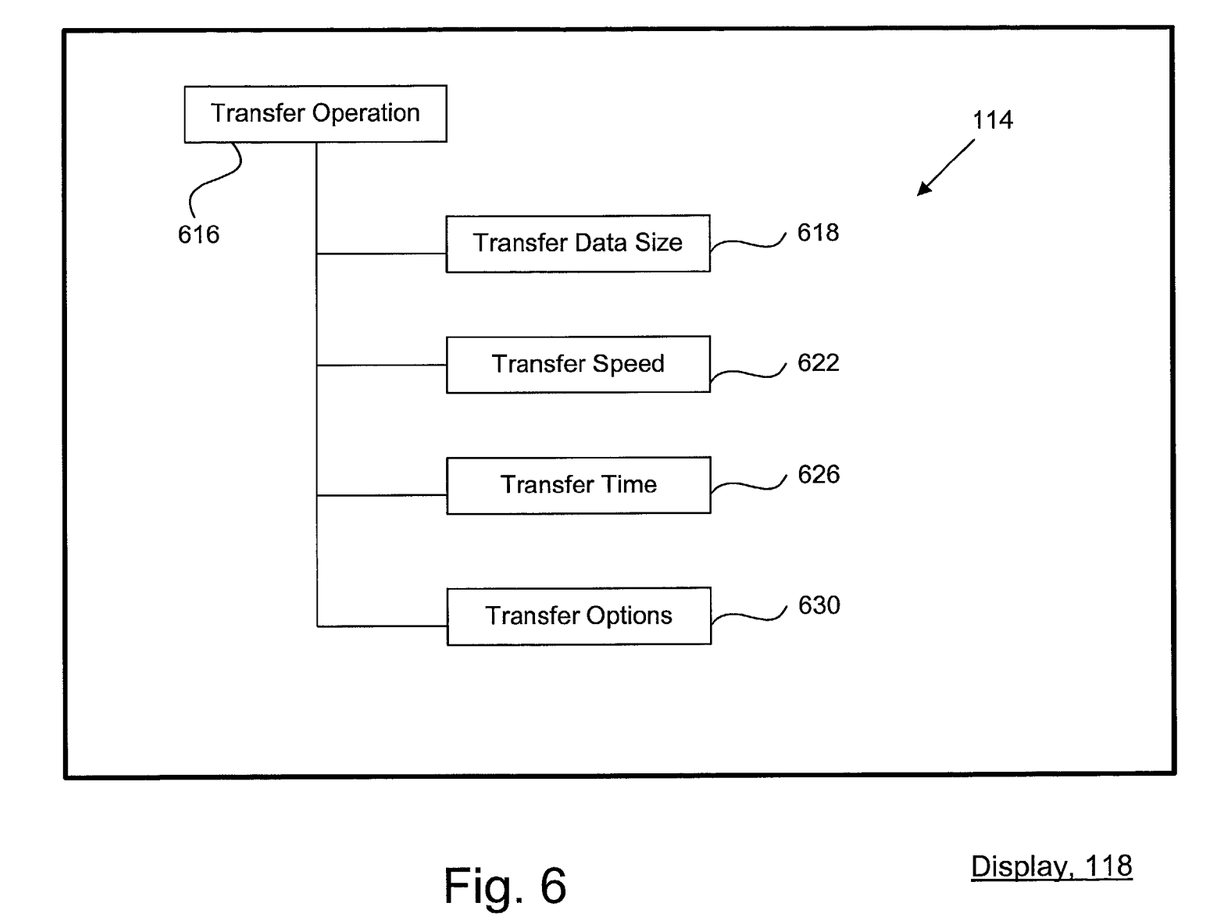

Referring now to FIG. 6, a block diagram for one embodiment of the FIG. 1 display 118 is shown, in accordance with the present invention. In the FIG. 6 embodiment, display 118 preferably comprises, but is not limited to, a user interface 114 corresponding to a particular identified data transfer operation 616. The FIG. 6 embodiment is presented for purposes of illustration, and in alternate embodiments, display 118 may readily include various other elements in addition to, or instead of, those discussed in conjunction with the FIG. 6 embodiment.

In the FIG. 6 example, the user interface 114 shown on display 118 may include an identifier representation 616 corresponding to a current proposed data transfer operation that includes further representation fields for a transfer data size 618, a transfer speed 622, a transfer time 626, and one or more transfer options 630.

In the FIG. 6 embodiment, transfer data size 618 may include a total bit value for data 216 corresponding to a proposed data transfer operation. In alternate embodiments, transfer data size 618 may be expressed in any other appropriate manner. In the FIG. 6 embodiment, transfer speed 622 may include a transfer rate value for performing the proposed data transfer operation. Electronic device 110 may determine transfer speed 622 using any suitable method. Techniques for determining transfer speed 622 are further discussed below in conjunction with FIG. 7.

As discussed above in conjunction with FIG. 4, transfer time 626 may be calculated by electronic device 110 using any relevant information. In the FIG. 6 embodiment, transfer manager 218 preferably calculates transfer time 626 by referencing transfer data size 618 and transfer speed 622. A system user may then refer to transfer time 626 to determine whether the particular transfer time 626 is acceptable under current conditions and user constraints.

In the FIG. 6 embodiment, a system user may interactively utilize various transfer options 630 in the event that transfer time 630 is unacceptable or not optimal under current conditions. In alternate embodiments, transfer options 630 may readily be implemented as a separate user interface or dialog on electronic device 110 or elsewhere.

In accordance with the present invention, transfer options 630 may include any appropriate or desired means for allowing a system user to interact with electronic device 110 to efficiently perform a proposed data transfer operation. Transfer options 630 may include various data manipulation options for altering data 216 to facilitate acceptable performance of the proposed data transfer operation. In the FIG. 6 embodiment, transfer manager 218 may reduce the size of data 216 in response to system user instructions if transfer time 626 is excessive under the circumstances. For example, in an case in which data 216 includes image data, transfer manager 218 may resize the corresponding image, crop the image, change the image resolution, or perform various other data manipulation procedures on data 216.

Alternately, in cases in which transfer time 626 is not constrained, a system user may also advantageously utilize transfer manager 218 to perform various data enhancement procedures on data 216 with the ultimate result that transfer time 216 is increased instead of decreased. In addition to the foregoing data manipulation option for altering data 216, transfer options 630 may also include a send option to immediately perform the proposed data transfer operation, a cancel option for canceling the proposed data transfer operation (with the potential option of attempting the proposed data transfer operation at a later time), and a change mode option in which electronic device 110 may subsequently attempt to perform the proposed data transfer operation using a different communication technique that may provide more favorable transfer conditions.

Figure 7:
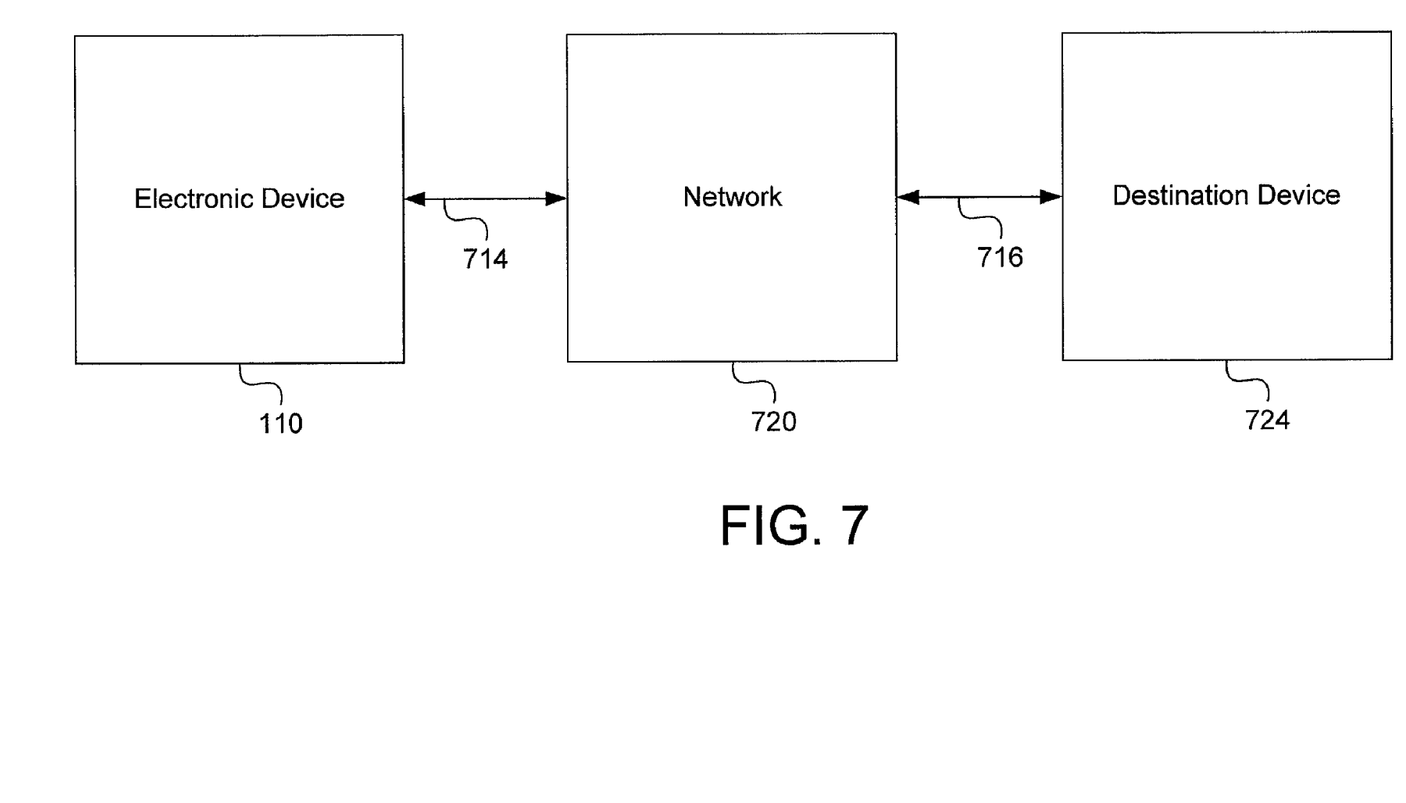

Referring now to FIG. 7, a block diagram of an electronic data transfer system is shown, in accordance with one embodiment of the present invention. In the FIG. 7 embodiment, the electronic data transfer system preferably includes, but is not limited to, a source electronic device 110, a network 720, and a destination device 724. The FIG. 7 embodiment is presented for purposes of illustration, and in alternate embodiments of the present invention, electronic data transfer systems may readily include various other components or functionalities in addition to, or instead of, those discussed in conjunction with the FIG. 7 embodiment.

In the FIG. 7 embodiment, a system user may issue a transfer request for performing a data transfer operation between electronic device 110 and destination device 724 using data 216 (FIG. 2). In the FIG. 7 embodiment, electronic device 110 and destination device 724 may be implemented as any appropriate electronic device, entity, node, or system.

In response, a bandwidth monitor 412 from transfer manager 218 of electronic device 110 may preferably determine the bandwidth or transfer speed of the transfer connection from electronic device 714, through source link 714, network 720, and destination link 716, to destination device 724. In the FIG. 7 embodiment, source link 714, network 720, and destination link 716 may include any desired communication path between electronic device 110 and destination device 724.

For example, source link 714, network 720, and destination link 716 may be a direct communication link (wired or wireless) between electronic device 110 and destination device 724 without any other nodes or devices. Alternately, network 720 may comprise any distributed electronic network of electronic devices or other entities. For example, network 720 may include a distributed local or wide-area computer network. In certain embodiments, network 720 may include the Internet with which communications manager 312 of electronic device 110 may connect to perform the proposed data transfer operation.

In the FIG. 7 embodiment, bandwidth monitor 412 may determine the foregoing transfer speed using any suitable technique. For example, network 720 may periodically provide a bandwidth value to electronic device 110 to thereby indicate current bandwidth conditions for data transfer operations through network 720. Bandwidth monitor 412 may then responsively convert the received bandwidth value into a current transfer speed value that may be stored into transfer parameters 428 in memory 116.

Alternately, electronic device 110 may transmit a bandwidth test packet to network 720 or to destination device 724, which may responsively return the bandwidth test packet to electronic device 110, or may acknowledge receiving the bandwidth test packet. Bandwidth monitor 412 may thus determine a transfer speed based upon an elapsed transfer time of the bandwidth test packet (calculated from transmission time of the test packet), and a known bandwidth test packet size or a known packet transmission distance.

In the FIG. 7 embodiment, a calculation module 416 from transfer manager 218 may then preferably determine a transfer data size value by analyzing data 216, and responsively calculate a transfer time value for the proposed data transfer operation by utilizing the foregoing transfer data size value and transfer speed value. A user interface module 320 and a display manager 222 may then display the foregoing transfer time value to the system user, who may interactively decide whether to proceed with the proposed data transfer operation, or to utilize various transfer options, as discussed above in conjunction with FIG. 6.

In certain embodiments, the system user may specify an optimal or acceptable transfer time value to transfer manager 218. In response, transfer manager 218 may advantageously determine one or more transfer options that would permit electronic device 110 to perform the data transfer operation using the requested transfer time value. For example, transfer manager 218 may calculate an optimal data format or size for achieving the desired transfer time value. In response to an authorization from the system user, transfer manager 218 may then automatically convert data 216 into the optimal format for the data transfer operation.

Figure 8:
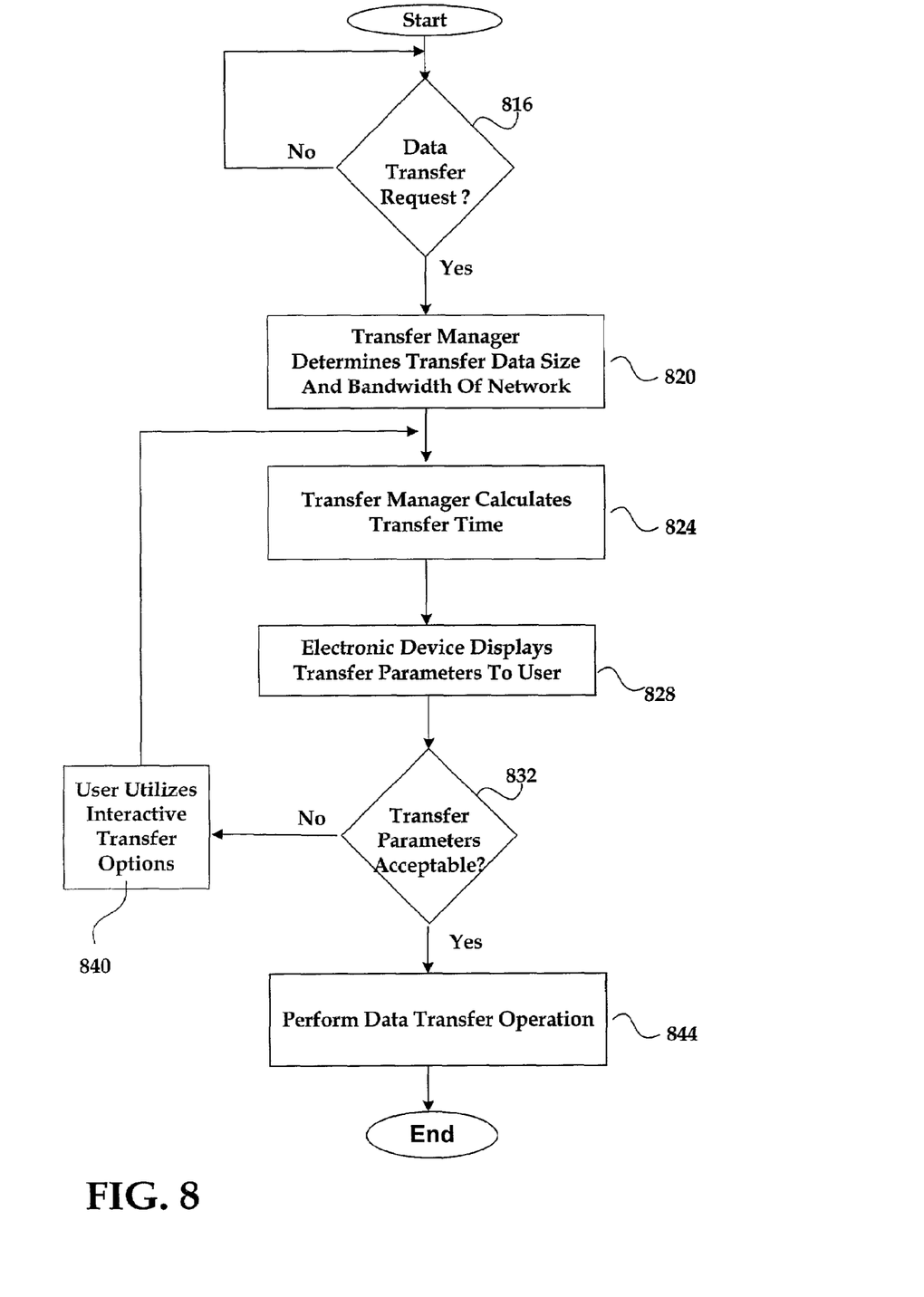

Referring now to FIG. 8, a flowchart of method steps for efficiently performing a data transfer operation is shown, in accordance with one embodiment of the present invention. The FIG. 8 example is presented for purposes of illustration, and, in alternate embodiments, the present invention may readily utilize various other steps and sequences than those discussed in conjunction with the FIG. 8 embodiment.

In the FIG. 8 embodiment, initially, in step 816, electronic device 110 waits for a data transfer request from a system user or other source (such as application software 212) to perform a data transfer operation using data 216. If electronic device 110 receives a data transfer request, then, in step 820, transfer manager 218 may preferably determine a transfer data size value corresponding to data 216 for the data transfer operation. In addition, a bandwidth monitor 412 from transfer manager 218 may preferably determine the current bandwidth (or transfer speed value) of the network communication link for the proposed data transfer operation, as discussed above in conjunction with FIG. 7.

In step 824, a calculation module 416 from transfer manager 218 may preferably calculate a transfer time value for the proposed data transfer operation. In the FIG. 8 embodiment, transfer manager 218 may determine the foregoing transfer time value using any appropriate technique. For example, transfer manager 218 may utilize the transfer data size value and the transfer speed value obtained in foregoing step 820, as discussed above in conjunction with FIG. 4.

In step 828, a user interface module 320 and a display manager 222 from electronic device 110 may preferably access transfer parameters 428 from memory 116, and responsively display the transfer parameters 428 for viewing by a system user. In the FIG. 8 embodiment, transfer parameters 428 may preferably include the transfer data size value, the transfer speed value, and the transfer time value discussed above.

In step 832, the system user determines whether the displayed transfer parameters 428 (in particular, the transfer time value) are acceptable under current circumstances. In step 844, if the displayed transfer parameters are acceptable to the system user, then electronic device 110 may preferably perform the proposed data transfer operation after receiving an authorization from the system user.

However, in step 840, if the displayed transfer parameters are not acceptable to the system user, then electronic device 110 may preferably display various transfer options for viewing by the system user. In certain embodiments, electronic device 110 may also enter a "hint" mode in which electronic device 110 may advantageously utilize appropriate hint-generation software to intelligently display various user options based upon a past history of electronic device 110. The hint mode may also selectably generate various types of explanatory information to explain aspects of the foregoing transfer options to a system user.

The system user may then interactively utilize the displayed transfer options, as discussed above in conjunction with FIG. 6. The FIG. 8 method then may preferably return to step 824 to recalculate and display transfer parameters 428 until the system user accepts the current transfer parameters 428 and authorizes the proposed data transfer operation.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing a data transfer operation, comprising:
    a source device for providing transfer data to a destination device through a communication path during said data transfer operation, said source device being implemented to include a digital camera device; and
    a transfer manager configured to determine a transfer duration for said data transfer operation, said transfer manager being integral to said source device for providing said transfer duration to a system user of said source device for interactively managing said data transfer operation, said transfer manager providing transfer options on a user interface of said source device, said system user interactively manipulating said transfer data using said transfer options to change said transfer duration of said data transfer operation into an acceptable time period under current transfer conditions, said source device converting a bandwidth value from said communication oath into a transfer speed value for determining said transfer duration.

2. The system of claim 1 wherein said source device is implemented to include said digital camera device with a processor, a display, one or more input/output interfaces, a memory, and a user interface.

3. The system of claim 1 wherein said transfer data includes digital image data, said communication path being coupled to an Internet network, said destination device including an image station website that is coupled to said Internet network.

4. The system of claim 1 wherein said transfer manager includes a bandwidth monitor for determining a current transfer speed for said data transfer operation, a calculation module for determining a data size value corresponding to said transfer data, and for calculating said transfer duration using said data size value and said current transfer speed, an option manager for controlling transfer options to interactively manipulate said transfer data, a data editor for altering said transfer data, and stored transfer parameters that include said data size value, said current transfer speed, and said transfer duration.

5. The system of claim 1 wherein said source device includes one or more input/output interfaces that communicate with at least one of a distributed computer network, an Internet network, a host computer, a cellular telephone network, one or more user interfaces, a wireless communications network, and one or more removable storage media devices.

6. The system of claim 1 wherein said source device includes said user interface presented by a user interface module and a display manager on a local display device, said user interface displaying a visual representation corresponding to said data transfer operation, said visual representation including a transfer data size field, a transfer speed field, a transfer time field, and one or more transfer option fields for interactive transfer optimizations performed by said system user.

7. The system of claim 6 wherein said one or more transfer option fields include, a perform transfer option, a cancel transfer option, a postpone transfer option, a change transfer-mode option, and an alter transfer-data option, said alter transfer-data option including a reduce data-size option, an increase data-size option, a crop image option, a reduce image-resolution option, an increase image-resolution option, and a compress data option.

8. The system of claim 1 wherein at least one of said system user, a software program, and an electronic entity initially begins said data transfer procedure by issuing a data transfer request to said source device.

9. The system of claim 8 wherein a calculation module from said transfer manager responsively determines a data size value corresponding to said transfer data, said data size value being stored in transfer parameters of a local memory device.

10. The system of claim 9 wherein a bandwidth monitor from said transfer manager determines said transfer speed value for performing said data transfer procedure under current transfer conditions, said transfer speed value being stored in said transfer parameters of said local memory device.

11. The system of claim 10 wherein said source device transmits a bandwidth test packet to one of said communication path and said destination device, said one of said communication path and said destination device responsively returning an acknowledgement of said bandwidth test packet to source device, said bandwidth monitor of said transfer manager responsively calculating said transfer speed value based upon an elapsed test packet transfer time.

12. The system of claim 10 wherein said calculation module from said transfer module calculates a transfer time value corresponding to said transfer duration, said transfer time value being stored in said transfer parameters of said local memory device.

13. The system of claim 12 wherein said calculation module calculates said transfer time value according to a formula:

Transfer Time Value=Data Size Value/Transfer Speed Value where said Transfer Time Value is an amount of time required to complete said data transfer operation in seconds, said Data Size Value is a size of said transfer data in bits, and said Transfer Speed Value is a bandwidth of said communication path for said data transfer operation in bits per second.

14. The system of claim 12 wherein said system user authorizes said source device to perform said data transfer operation whenever said transfer time value is acceptable under said current conditions.

15. The system of claim 12 wherein said system user interactively utilizes one or more transfer options that are presented by said source device on a user interface to thereby optimize said data transfer operation under said current conditions.

16. The system of claim 15 wherein said transfer manager repeatedly recalculates and displays said transfer parameters on said user interface to thereby allow said system user to optimize said data transfer operation under said current conditions.

17. The system of claim 1 wherein said system user specifies an optimal value for said transfer duration under current conditions, said transfer manager automatically altering said transfer data using available transfer options to thereby permit said source device to perform said data transfer operation using said optimal value for said transfer duration.

18. A system for performing a data transfer operation, comprising:
a source device for providing transfer data to a destination device through a communication path during said data transfer operation, said source device being implemented to include a digital camera device; and
a transfer manager configured to determine a transfer duration for said data transfer operation, said transfer manager being integral to said source device for providing said transfer duration to a system user of said source device for interactively managing said data transfer operation, said transfer manager providing transfer options on a user interface of said source device, said system user interactively manipulating said transfer data using said transfer options to change said transfer duration of said data transfer operation into an acceptable time period under current transfer conditions, at least one of said system user, a software program, and an electronic entity initially beginning said data transfer procedure by issuing a data transfer request to said source device, a calculation module from said transfer manager responsively determining a data size value corresponding to said transfer data, said data size value being stored in transfer parameters of a local memory device, a bandwidth monitor from said transfer manager determining a said transfer speed value for performing said data transfer procedure under current transfer conditions, said transfer speed value being stored in said transfer parameters of said local memory device a transfer speed module of said communication path periodically providing a bandwidth value to said transfer manager to thereby indicate current bandwidth conditions for any data transfer operations through said communication path, said bandwidth monitor responsively converting said bandwidth value into said transfer speed value that is then stored into said transfer parameters in said local memory device.

19. A method for performing a data transfer operation, comprising the steps of:
transferring data from a source device to a destination device through a communication path during said data transfer operation, said source device being implemented to include a digital camera device;
determining a transfer duration for said data transfer operation by using a transfer manager of said source device; and
providing said transfer duration to a system user of said source device for interactively managing said data transfer operation, said transfer manager providing transfer options on a user interface of said source device, said system user interactively manipulating said transfer data using said transfer options to change said transfer duration of said data transfer operation into an acceptable time period under current transfer conditions, said source device converting a bandwidth value from said communication path into a transfer speed value for determining said transfer duration.

20. The method of claim 19 wherein said source device is implemented to include said digital camera device with a processor, a display, one or more input/output interfaces, a memory, and a user interface.

21. The method of claim 19 wherein said transfer data includes digital image data, said communication path being coupled to an Internet network, said destination device including an image station website that is coupled to said Internet network.

22. The method of claim 19 wherein said transfer manager includes a bandwidth monitor for determining a current transfer speed for said data transfer operation, a calculation module for determining a data size value corresponding to said transfer data, and for calculating said transfer duration using said data size value and said current transfer speed, an option manager for controlling transfer options to interactively manipulate said transfer data, a data editor for altering said transfer data, and stored transfer parameters that include said data size value, said current transfer speed, and said transfer duration.

23. The method of claim 19 wherein said source device includes one or more input/output interfaces that communicate with at least one of a distributed computer network, an Internet network, a host computer, a cellular telephone network, one or more user interfaces, a wireless communications network, and one or more removable storage media devices.

24. The method of claim 19 wherein said source device includes said user interface presented by a user interface module and a display manager on a local display device, said user interface displaying a visual representation corresponding to said data transfer operation, said visual representation including a transfer data size field, a transfer speed field, a transfer time field, and one or more transfer option fields for interactive transfer optimizations performed by said system user.

25. The method of claim 24 wherein said one or more transfer option fields include a perform transfer option, a cancel transfer option, a postpone transfer option, a change transfer-mode option, and an alter transfer-data option, said alter transfer-data option including a reduce data-size option, an increase data-size option, a crop image option, a reduce image-resolution option, an increase image-resolution option, and a compress data option.

26. The method of claim 19 wherein at least one of said system user, a software program, and an electronic entity initially begins said data transfer procedure by issuing a data transfer request to said source device.

27. The method of claim 26 wherein a calculation module from said transfer manager responsively determines a data size value corresponding to said transfer data, said data size value being stored in transfer parameters of a local memory device.

28. The method of claim 27 wherein a bandwidth monitor from said transfer manager determines said transfer speed value for performing said data transfer procedure under current transfer conditions, said transfer speed value being stored in said transfer parameters of said local memory device.

29. The method of claim 28 wherein said source device transmits a bandwidth test packet to one of said communication path and said destination device, said one of said communication path and said destination device responsively returning an acknowledgement of said bandwidth test packet to source device, said bandwidth monitor of said transfer manager responsively calculating said transfer speed value based upon an elapsed test packet transfer time.

30. The method of claim 28 wherein said calculation module from said transfer module calculates a transfer time value corresponding to said transfer duration, said transfer time value being stored in said transfer parameters of said local memory device.

31. The method of claim 30 wherein said calculation module calculates said transfer time value according to a formula:

Transfer Time Value=Data Size Value/Transfer Speed Value where said Transfer Time Value is an amount of time required to complete said data transfer operation in seconds, said Data Size Value is a size of said transfer data in bits, and said Transfer Speed Value is a bandwidth of said communication path for said data transfer operation in bits per second.

32. The method of claim 30 wherein said system user authorizes said source device to perform said data transfer operation whenever said transfer time value is acceptable under said current conditions.

33. The method of claim 30 wherein said system user interactively utilizes one or more transfer options that are presented by said source device on a user interface to thereby optimize said data transfer operation under said current conditions.

34. The method of claim 33 wherein said transfer manager repeatedly recalculates and displays said transfer parameters on said user interface to thereby allow said system user to optimize said data transfer operation under said current conditions.

35. The method of claim 19 wherein said system user specifies an optimal value for said transfer duration under current conditions, said transfer manager automatically altering said transfer data using available transfer options to thereby permit said source device to perform said data transfer operation using said optimal value for said transfer duration.

36. The method of claim 19 further comprising the step of entering a hint mode wherein said transfer manager provides one or more transfer options for performing said data transfer operation, and wherein a hint subroutine responsively generates at least one of a transfer recommendation and a transfer explanation for said data transfer operation, said hint subroutine being activated by at least one of a system user action and an automatic initiation event from said source device.

37. The method of claim 19 wherein said source device is implemented as a stand-alone digital still camera that performs said data transfer operations to transmit said transfer data to said destination device.

38. The method of claim 19 wherein system user repeatedly utilizes said user interface of said source device to evaluate said transfer duration for each instance of said data transfer operation before allowing said source device to transmit said transfer data to said destination device.

39. A system for performing a data transfer operation, comprising:

a source device for providing transfer data to a destination device through a communication path during said data transfer operation, said source device being implemented to include a digital camera device; and a transfer manager configured to determine a transfer duration for said data transfer operation, said transfer manager being integral to said source device for providing said transfer duration to a system user of said source device for interactively managing said data transfer operation, said transfer manager providing transfer options on a user interface of said source device, said system user interactively manipulating said transfer data using said transfer options to change said transfer duration of said data transfer operation into an acceptable time period under current transfer conditions, at least one of said system user, a software program, and an electronic entity initially beginning said data transfer procedure by issuing a data transfer request to said source device, a calculation module from said transfer manager responsively determining a data size value corresponding to said transfer data, said data size value being stored in transfer parameters of a local memory device, a bandwidth monitor from said transfer manager determining a transfer speed value for performing said data transfer procedure under current transfer conditions, said transfer speed value being stored in said transfer parameters of said local memory device, said calculation module from said transfer module calculating a transfer time value corresponding to said transfer duration, said transfer time value being stored in said transfer parameters of said local memory device, said system user interactively utilizing one or more transfer options that are presented by said source device on a user interface to thereby optimize said data transfer operation under said current conditions, said transfer options including a perform transfer option, a cancel transfer option, a postpone transfer option, a change transfer-mode option, and an alter transfer-data option, said alter transfer-data option including a reduce data-size option, an increase data-size option, a crop image option, a reduce image-resolution option, an increase image-resolution option, and a compress data option.

40. A method for performing a data transfer operation, comprising the steps of:

transferring data from a source device to a destination device through a communication oath during said data transfer operation, said source device being implemented to include a digital camera device;

determining a transfer duration for said data transfer operation by using a transfer manager of said source device; and providing said transfer duration to a system user of said source device for interactively managing said data transfer operation, said transfer manager providing transfer options on a user interface of said source device, said system user interactively manipulating said transfer data using said transfer options to change said transfer duration of said data transfer operation into an acceptable time period under current transfer conditions, at least one of said system user, a software program, and an electronic entity initially beginning said data transfer procedure by issuing a data transfer request to said source device, a calculation module from said transfer manager responsively determining a data size value corresponding to said transfer data, said data size value being stored in transfer parameters of a local memory device, a bandwidth monitor from said transfer manager determining a transfer speed value for performing said data transfer procedure under current transfer conditions, said transfer speed value being stored in said transfer parameters of said local memory device, a transfer speed module of said communication path periodically providing a bandwidth value to said transfer manager to thereby indicate current bandwidth conditions for any data transfer operations through said communication path, said bandwidth monitor responsively converting said bandwidth value into said transfer speed value that is then stored into said transfer parameters in said local memory device.

41. A method for performing a data transfer operation, comprising the steps of:

transferring data from a source device to a destination device through a communication path during said data transfer operation, said source device being implemented to include a digital camera device;

determining a transfer duration for said data transfer operation by using a transfer manager of said source device; and providing said transfer duration to a system user of said source device for interactively managing said data transfer operation, said transfer manager providing transfer options on a user interface of said source device, said system user interactively manipulating said transfer data using said transfer options to change said transfer duration of said data transfer operation into an acceptable time period under current transfer conditions, at least one of said system user, a software program, and an electronic entity initially beginning said data transfer procedure by issuing a data transfer request to said source device, a calculation module from said transfer manager responsively determining a data size value corresponding to said transfer data, said data size value being stored in transfer parameters of a local memory device, a bandwidth monitor from said transfer manager determining a transfer speed value for performing said data transfer Procedure under current transfer conditions, said transfer speed value being stored in said transfer parameters of said local memory device, said calculation module from said transfer module calculating a transfer time value corresponding to said transfer duration, said transfer time value being stored in said transfer parameters of said local memory device, said system user interactively utilizing one or more transfer options that are presented by said source device on a user interface to thereby optimize said data transfer operation under said current conditions, said transfer options including a perform transfer option, a cancel transfer option, a postpone transfer option, a change transfer-mode option, and an alter transfer-data option, said alter transfer-data option including a reduce data-size option, an increase data-size option, a crop image option, a reduce image-resolution option, an increase image-resolution option, and a compress data option.

42. A computer-readable medium comprising program instructions for transferring data by performing the steps of:

transferring data from a source device to a destination device through a communication path during said data transfer operation, said source device being implemented to include a digital camera device;

determining a transfer duration for said data transfer operation by using a transfer manager of said source device; and providing said transfer duration to a system user of said source device for interactively managing said data transfer operation, said transfer manager providing transfer options on a user interface of said source device, said system user interactively manipulating said transfer data using said transfer options to change said transfer duration of said data transfer operation into an acceptable time period under current transfer conditions, said source device converting a bandwidth value from said communication path into a transfer speed value for determining said transfer duration.

43. A system for performing a data transfer operation, comprising:

means for transferring data from a source device to a destination device through a communication path during said data transfer operation, said source device being implemented to include a digital camera device;

means for determining a transfer duration for said data transfer operation, said means for determining being coupled to said source device; and means for providing said transfer duration to a system user of said source device for interactively managing said data transfer operation, said means for determining providing transfer options on a user interface of said source device, said system user interactively manipulating said transfer data using said transfer options to change said transfer duration of said data transfer operation into an acceptable time period under current transfer conditions, said source device converting a bandwidth value from said communication path into a transfer speed value for determining said transfer duration.

* * * * *